(12) United States Patent
Hunziker et al.

(10) Patent No.: US 7,009,788 B2
(45) Date of Patent: Mar. 7, 2006

(54) METHOD OF MAKING A ROTATIONAL OPTICAL ARRANGEMENT, AND THE OPTICAL ARRANGEMENT MADE BY THE METHOD

(75) Inventors: Michael Hunziker, Rapperswil (CH); Othmar Zuger, Triesen (LI); Roger Bischofberger, Buchs (CH)

(73) Assignee: Unaxis Balzers Ltd.,, Balzers (LI)

( * ) Notice: Subject to any disclaimer, the term of this patent is extended or adjusted under 35 U.S.C. 154(b) by 67 days.

(21) Appl. No.: 10/322,972

(22) Filed: Dec. 18, 2002

(65) Prior Publication Data

US 2003/0117590 A1 Jun. 26, 2003

Related U.S. Application Data

(60) Provisional application No. 60/342,541, filed on Dec. 20, 2001.

(51) Int. Cl.
*G02B 5/22* (2006.01)
*G02B 7/00* (2006.01)
(52) U.S. Cl. ............... 359/892; 359/200; 359/234
(58) Field of Classification Search ........... 359/200, 359/234, 885, 889, 891, 892
See application file for complete search history.

(56) References Cited

U.S. PATENT DOCUMENTS

| | | | | |
|---|---|---|---|---|
| 4,165,919 A | * | 8/1979 | Little | ............... 359/234 |
| 4,249,824 A | | 2/1981 | Wiederrich et al. | |
| 4,556,278 A | | 12/1985 | Schell | |
| 4,756,586 A | | 7/1988 | Witteveen | |
| 5,183,350 A | | 2/1993 | Kramer | |
| 5,371,543 A | * | 12/1994 | Anderson | ............... 348/270 |

* cited by examiner

*Primary Examiner*—Mark A. Robinson
(74) *Attorney, Agent, or Firm*—Pearne & Gordon LLP

(57) ABSTRACT

A method of making a rotational optical arrangement and the arrangement made by the method, wherein the method includes providing a rotatable unit. The unit has a surface extending transverse to a center axis of the unit and at a predefined angle to an interface normal direction, and the unit having a pattern with at least two portions that each have a different optical characteristic. A mechanism is provided for rotating the unit around a mechanism-induced rotational axis. The center axis of the unit is separately aligned to the mechanism-induced rotational axis for radial offset correction. The interface normal direction is separately aligning to the mechanism-induced rotational axis for skew correction.

5 Claims, 7 Drawing Sheets

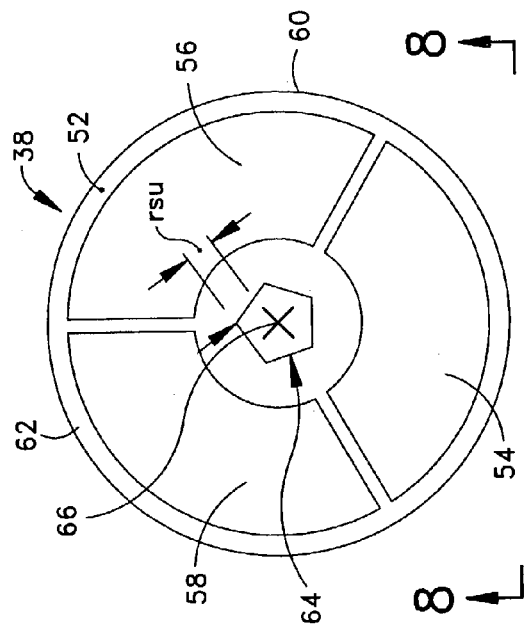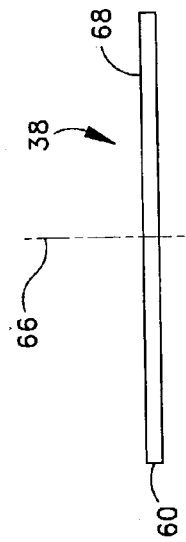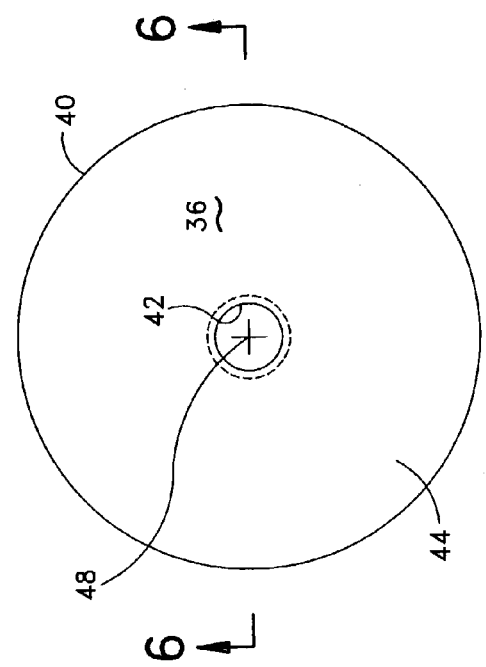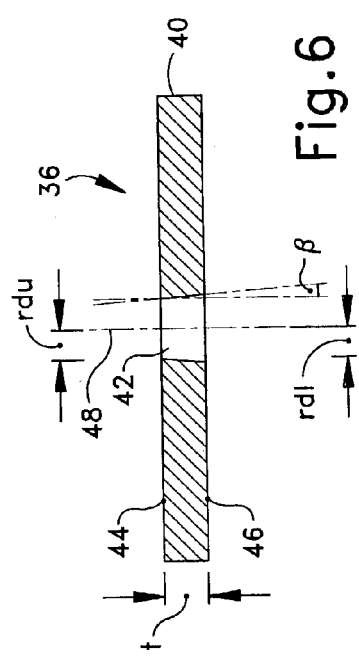

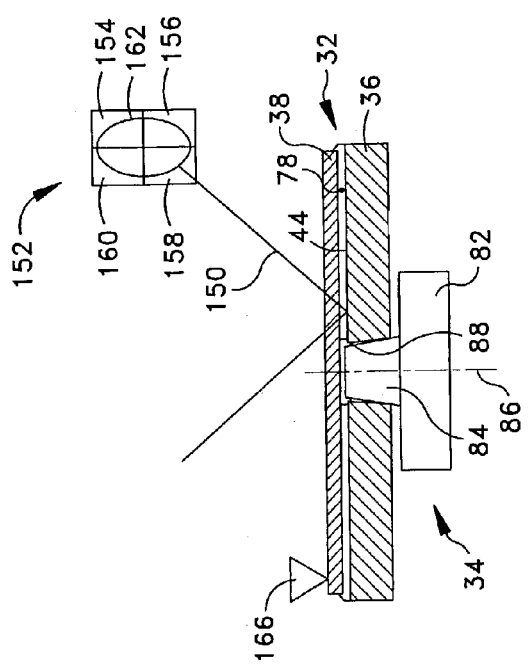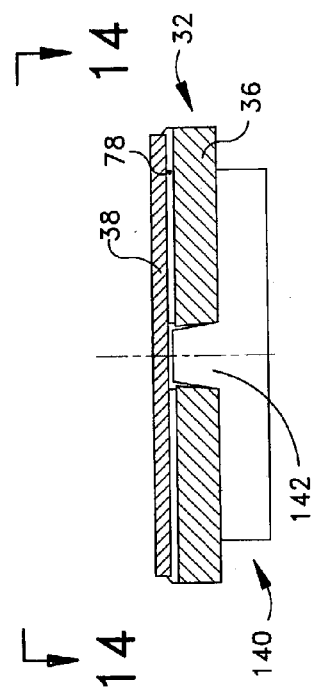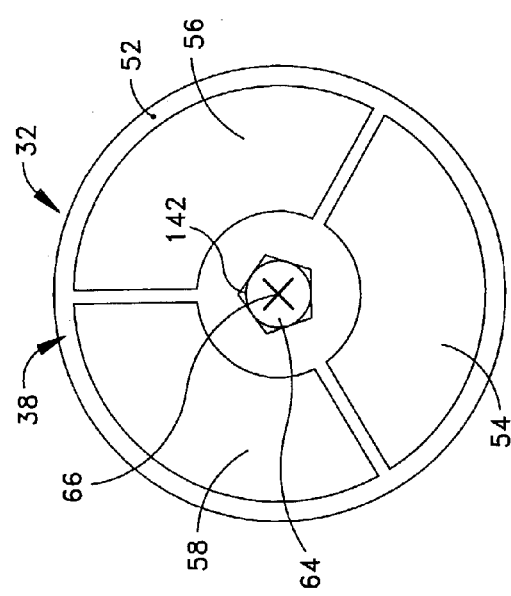

METHOD OF MAKING A ROTATIONAL OPTICAL ARRANGEMENT, AND THE OPTICAL ARRANGEMENT MADE BY THE METHOD

RELATED APPLICATION

Benefit of priority is hereby claimed from prior U.S. Provisional Patent Application Ser. No. 60/342,541, filed Dec. 20, 2001.

FIELD OF THE INVENTION

The present invention relates to methods making rotational optical arrangements (e.g., optical wheels) with radial offset correction and skew correction, and rotational optical arrangements having radial offset correction and skew correction.

BACKGROUND OF THE INVENTION

Within a rotational optical arrangement, an electromagnetic (EM) energy path is defined so that the EM energy is incident upon only a portion of the rotational optical arrangement. A component of the EM energy proceeds away from the optical arrangement. The composition of the EM energy component proceeding from the arrangement is dependent upon a characteristic of the portion of the arrangement upon which the EM energy is incident. Typically, such arrangements are utilized to either reflect or transmit EM energy in a manner that differs according to rotational position of the arrangement.

Although such arrangements find application at various portions of the EM energy spectrum, the most common use is for the light portion of the EM spectrum. As such, the discussion herein is directed primarily to the application to light. For use with light, rotational optical arrangements are utilized for many applications. In one example, the optical arrangement is an optical wheel that has a plurality of optical filters. In a specific example, the optical arrangement includes a plurality of deflection mirror components that are associated with the optical filtering.

Each filter permits progress of a certain optical characteristic, such as a certain color portion of the spectrum. During rotation of the optical wheel, the different optical filters are sequentially brought into a light path. These optical wheels are often used to generate a multicolor image (e.g., a video image) for a display device or system. During operation, the optical wheel is rotated very rapidly such that the optical filters are rapidly, sequentially brought into the light path. For the color wheel, the rapid rotation provides for rapid color change.

In another example, the optical filters may provide differing degrees of polarization. Still further, any other optical characteristics may be employed within the rotational optical arrangement (e.g., holography). As mentioned, the optical arrangement may provide for either reflection or transmission of the light characteristics associated with specific optical filters. Again, all of the possible examples of such a rotational optical arrangement rely upon rotation to sequentially bring the optical filters (e.g., reflective/transmissive, color/polarization, etc.) into the light path.

The path of the incident light proceeding toward the optical arrangement is generally controlled by the positioning and targeting (i.e., focusing) associated with the light source. However, the light component(s) proceeding from the optical arrangement is dependent upon positioning, orientation, etc. of the optical arrangement. Typically, in order to have suitable usability of the light component(s) proceeding from the rotational optical arrangement, the proceeding light component(s) must have precise orientation (e.g., direction). For example, a rotational optical arrangement may be utilized within a system that must be able to produce a high quality image. Associated with such high quality image production, optical changes are executed very rapidly. As such, the optical filters of the rotational optical arrangement are moved (i.e., rotated) though the path of the light beam at a very high speed. Rotation within the optical arrangement must accordingly be associate with a well-centered and balanced drive (e.g., a motor). High accuracy of radial concentricity is desirable in order to achieve a long operational life. Further, for good image quality, radial offset and skew offset of the rotating optical filters should be minimized. Such minimization will promote a well-defined sequence and accurate synchronization.

FIG. 1 is a side view of an example of a rotational optical arrangement 10 that includes a rotational disk 12 and a motor platform 14. The disk 12 has a series of optical components (e.g., filters) spaced about its periphery. The motor platform 14 has a center rotational axis 16. The disk 12 is affixed to the motor platform 14 such that the motor platform 14 rotates the disk. The rotation of the disk 12 causes the sequential movement of the optical components on the disk relative to as incident beam of light (not shown).

The disk 12 includes an upper surface 18 with a center that provides reflection of a component of the incident beam based upon optical properties of the respective optical filtering component upon which the beam of light is incident. An interface normal direction 20 extends perpendicular to the plane of the upper surface 18, and is located in the center of the upper surface 18. In a perfect situation, the interface normal direction 20 is aligned with the center axis 16 of the motor platform 14. Specifically, the interface normal direction 20 is not spaced. radially from the center axis 16. Also, the interface normal direction 20 does not have any angle of inclination (i.e., skew) with regard to the center axis 16. In other words, the interface normal direction 20 is exactly coincident with the center axis 16.

However, during attachment of the disk 12 onto the motor platform 14 mounting errors can occur that result in the interface normal direction 20 not being perfectly coincident with center axis 16. FIG. 2 shows one example of the optical arrangement 10' with such an error. Within this example, the disk 12' is radially offset toward one direction (e.g., toward the right as shown in FIG. 2) relative to the motor platform 14'. This radial offset results in a radial displacement "d" of the interface normal direction 20' from the center axis 16'. Of course, it is to be appreciated that the displacement "d" as shown in FIG. 2 may be greatly exaggerated. However, the illustration of FIG. 2 is useful to indicate the concept of radial offset misalignment. Further, depending upon the precision needed, even a small amount of radial offset (displacement "d") may cause problems within the rotational optical arrangement 10'.

FIG. 3. illustrates skew between the disk 12" and the motor platform 14" of the optical arrangement 10". Specifically, the interface normal direction 20" is at an angle "α" relative to the center axis 16". Similar to FIG. 2, the error in the mounting, as shown by α within FIG. 3, may be greatly exaggerated. However, the indication of the occurrence of the angle "α" between the interface normal direction 20" and the center axis 16" is useful to indicate the error that can occur. Further, even the smallest skew angle "α" may cause a degradation in performance of the optical arrangement 10".

The radial offset "d" and the skew "α," as shown within FIGS. 2 and 3, may occur simultaneously. Further, the occurrence of one of radial offset or skew may occur upon efforts to correct the other of the radial offset or skew. This is due to the fact in order to try to produce the optical arrangement 10 as shown in FIG. 1, the disk 12 is mounted onto the motor platform 14 via a generally one step affixing procedure. Typically, the disk 12 is attached to the motor platform 14 via the use of adhesive with the disk then being manipulated relative to the motor platform to try and simultaneously correct radial offset and skew.

SUMMARY OF THE INVENTION

In accordance with one aspect, the present invention provides a method of making a rotational optical arrangement. A rotatable unit is provided. The unit has a surface extending transverse to a center axis of the unit. The normal on the surface is at a predefined angle to an interface normal direction. The unit has a pattern with at least two portions that each have a different optical characteristic. A mechanism for rotating the unit around a mechanism-induced rotational axis is provided. The center axis of the unit is separately aligned to the mechanism-induced rotational axis for radial offset correction. The interface normal direction is separately aligned to the mechanism-induced rotational axis for skew correction.

In accordance with another aspect, the present invention provides a method of making a rotational optical arrangement. A rotatable base is provided. The base has a surface extending perpendicular to an interface normal direction. An optical pattern layer for location on the surface of the base is provided. The optical pattern layer has a center axis and has at least two portions that each have a different optical characteristic. A mechanism for rotating the base and the optical pattern layer around a mechanism-induced rotational axis is provided. The interface normal direction is separately aligned to the mechanism-induced rotational axis for skew correction. The base is secured to the mechanism. The center axis is separately aligned to the mechanism-induced rotational axis for radial offset correction.

In accordance with yet another aspect, the present invention provides a method of making a rotational optical arrangement. A rotatable base is provided. An optical pattern layer is provided. The optical pattern layer is for location of the base. The optical pattern layer has at least two portions that each have a different optical characteristic. The optical pattern layer has a surface perpendicular to the interface normal direction and transverse to a center axis. The optical pattern layer is secured to the base for rotation therewith. A mechanism for rotating the base member and the secured optical pattern layer around a mechanism-induced rotational axis is provided. The center axis is separately aligned to the mechanism-induced rotational axis for radial offset correction. The interface normal direction is separately aligned to the mechanism-induced rotational axis for skew correction.

In accordance with still another aspect, the present invention provides an optical arrangement. The arrangement includes a base for rotation about a mechanism-induced rotational axis. An optical pattern layer of the arrangement has a center axis and has at least two portions that each have a different optical characteristic. One of the base and the optical pattern layer has a surface perpendicular to an interface normal direction. Means fixes the optical pattern layer to the base for rotation therewith such that the center axis is aligned against radial offset with the rotational axis. A mechanism rotates the base in the optical pattern layer around the mechanism-induced rotational axis. Means fixes the base to the mechanism such that the interface normal direction is aligned against skew from the mechanism-induced rotational axis.

BRIEF DESCRIPTION OF THE DRAWINGS

The forgoing and other features and advantages of the present invention will become apparent to those skilled in the art to which the present invention relates upon reading the following description with reference to accompanying drawings, wherein:

FIG. 5 is a plan view of a basic disk of the arrangement of FIG. 4;

FIG. 6 is a section view taken along line 6—6 within FIG. 5;

FIG. 7 is a plan view of an optical pattern disk of the arrangement of FIG. 4;

FIG. 8 is a side view taken along the line 8—8 within FIG. 7;

FIG. 13 is a partially sectioned view of a portion of the arrangement of FIG. 4 and the shaft equivalent of FIG. 12 showing one step of the process set forth within the flow chart of FIG. 11;

FIG. 14 is a top view taken along line 14—14 of FIG. 13;

FIG. 16 is a partially sectioned view of the components of the optical arrangement of FIG. 4 and also shows other process elements at a step of the process set forth within FIG. 11;

DESCRIPTION OF EXAMPLE EMBODIMENTS

Figure 1:
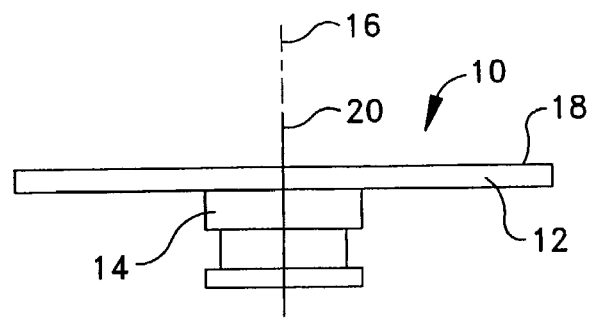
FIG. 1 is a schematic illustration of a known optical wheel assembly that has perfect alignment.
Figure 2:
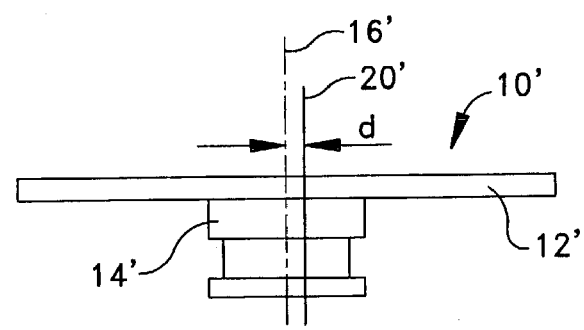
FIG. 2 is a view similar to FIG. 1, but shows a radial offset misalignment.
Figure 3:
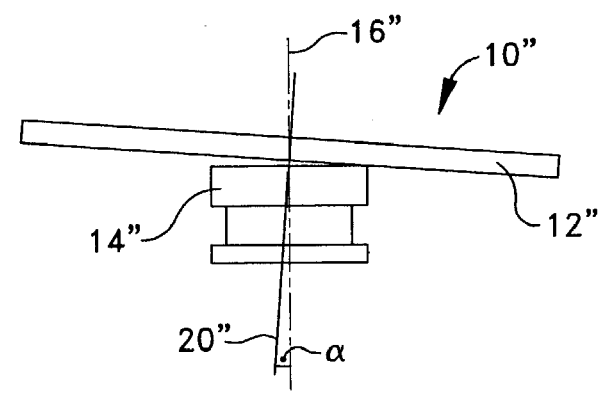
FIG. 3 is a view similar to FIG. 1, but shows a skew misalignment.
Figure 4:
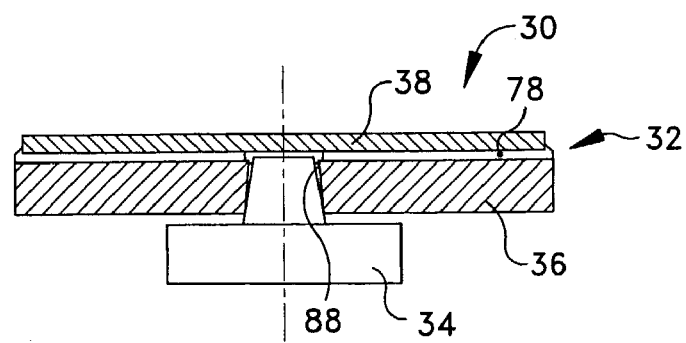
FIG. 4 shows one example of a rotational optical arrangement in accordance with the present invention.

One example of an optical arrangement 30 in accordance with the present invention is shown in FIG. 4. The optical arrangement 30 includes a completed disk arrangement 32 affixed to a rotational driving device 34. The disk arrangement includes a basic disk 36 and an optical pattern disk 38.

An example of the basic disk 36 is shown in FIG. 5. As shown, the basic disk has a circular outer periphery 40 and a circular central hole 42. However, it is to be appreciated that the hole 42 need not extend through the basic disk 36. It is sufficient that the hole 42 provide a space as will become apparent later in the description. Also, the basic disk has upper and lower planer surfaces 44 and 46 (FIG. 6). The basic disk 36 may be comprised of a material that provides suitable optical properties. For example, the basic disk 36 may include a composition of material that provides for transparency adjacent to its outer periphery 40. Also, the surfaces (e.g., 44 and 46) of the basic disk 36 may have suitable treatments. For example, the upper surface 44 may be polished to provide optical reflection. Also, the lower surface 46 may have an antireflection coating located thereon. Further, at least the center portion of the disk-shaped carrier 52 is transparent (i.e., not opaque). It is to be appreciated that other, different and/or additional material characteristics and properties may be provided by the basic disk 36.

The basic disk 36 has a thickness "t" that extends between the upper and lower surfaces 44 and 46 and is appreciated upon viewing FIG. 6. This thickness "t" may be of any suitable dimension. However, in one example, the basic disk 35 has a considerable thickness with regard to an overall thickness of the disk arrangement 32 (FIG. 4). In one specific example, the thickness "t" may be approximately one millimeter. It is to be appreciated that thickness of the basic disk 36 factors into considerations with regard to motor force necessary to drive the disk arrangement 32 and inertia associated with the motion of the disk arrangement.

Turning to the central hole 42 (FIG. 6) of the basic disk 36, the illustrated example of the central hole is tapered relative to a central axis 48 of the central hole. Specifically, a radius "rdu" of the central hole 42 that is adjacent to the upper surface 44 is less than a radius "rdl" of the central hole 42 adjacent to the lower surface 46. Accordingly, the central hole 42 has the shape of a truncated cone. The angle of the taper is "β." It is to be noted that the upper surface 44 is transverse, and specifically perpendicular, to the central axis 48. As such, the central axis 48 provides an interface normal direction of the upper surface 44.

With regard to the optical pattern disk 38, one example is shown in FIG. 7. It is to be appreciated that many other constructions and configurations of the optical pattern disk 38 are possible, and that the example of FIG. 7 shows but one construction and configuration and only some of the possible features of an optical pattern disk. The example pattern disk 38 is a plate and includes a disk-shaped carrier 52 and a plurality of filters (e.g., 54–58). In the illustrated example, three filters 54–58 are provided. Each of these filters 54–58 has a different optical characteristic. In one example, each of the filters 54–58 is a color filter that conveys a portion of the color spectrum (e.g., light associated with the conveyance characteristics of the filter are passed while light outside the of the conveyance characteristics of the filter are reflected or absorbed). For example, the first filter 54 may be a red filter, the second filter 56 may be a blue filter, and the third filter 58 may be a yellow filter. Of course, it is to be appreciated that other, additional/different optical characteristics may be utilized. Examples of other such optical characteristics include polarization, diffraction, etc. Each of the filters 54–58 extends in an arc around pattern disk 38 adjacent to an outer periphery 60. The extent of each of the filters 54–58 in the shown example is approximately 120°.

The disk-shaped carrier 52 extends around the radially outer periphery of the filters 54–58. Also, the disk-shaped carrier 52 extends radially inside of the three filters 54–58. Within the illustrated example, the disk-shaped carrier 52 and thus the pattern disk 38 does not contain a central hole. Still further the disk-shaped carrier 52 may have portions that extend between adjacent filters (e.g., 54 and 56). In one example, an upper surface 62 of the disk-shaped carrier 52 is reflective.

Center-indicating indicia 64 is located on the disk-shaped carrier 52 at the center portion of the pattern disk 38. The indicia 64 may have any suitable form and configuration. In the illustrated example shown in FIG. 7, the indicia includes a fiducial cross indicating the center of the pattern disk 38 and also includes a polynomial that circumscribes the center of the pattern disk (i.e., a central axis 66). It is to be appreciated that various other additional/different indicia may be utilized. For example, rings or concentric circles may be utilized. An upper surface 68 of the pattern disk 38 is transverse, and specifically perpendicular, to the central axis 66 of the pattern disk. Thus, the central axis 66 provides an interface interface normal direction for the upper surface 68.

Within the optical arrangement 30 (FIG. 4), the optical pattern disk 38 is mounted onto the basic disk 36. Also, at this point it should be appreciated that the basic disk 36 is mounted onto the rotational driving device 34. This two-step mounting provides two degrees of adjustment freedom that are independent from each other. This independent adjustment is an aspect of the present invention that will be described fully later.

Figure 9:
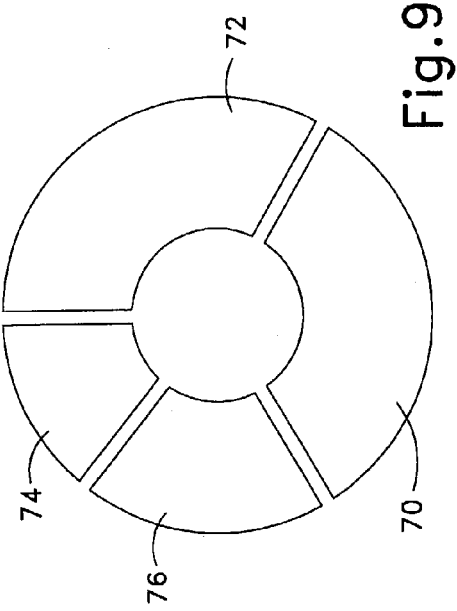
FIG. 9 is view of optical patterns that provide an alternative to the pattern disk shown in FIG. 7.

Turning back to the mounting of the pattern disk 38 onto to the basic disk 36, it is to be appreciated that the use of the pattern disk 38 with its disk-shaped carrier 52 that carries the filters 54–58 provides for ease of assembly when mounting the pattern disk 38 onto the basic disk 36. However, it should be appreciated that optical filters may be separately mounted onto the basic disk 36 in a series of steps or sub-steps that are still separate and independent from mounting of the basic disk onto the rotational driving device 34. One example of such separate filters is shown in FIG. 9. Specifically, the filters 70–76 are not carried by a disk-shaped carrier, as the example shown in FIG. 7. Each filter (e.g., 70) is separately mounted onto the basic disk 36. It should be noted that the example of FIG. 9 shows four filters 70–76 to further illustrate the fact that a different filter configuration (i.e., different number of filters) is possible. In one example, the filters 70–76 are associated with the colors red, white, blue, and green, respectively.

Turning back to the concept of mounting the pattern disk 38 (or individual filters) onto the basic disk 36 (see FIG. 4), the mounting is accomplished by the use of a means that permits adjustment for correction of the orientation of the pattern disk 38 (or the individual filters) prior to permanent affixing to the basic disk 36. In the illustrated example, adhesive 78 which has a setting time is utilized. In the illustrated example, the adhesive 78 is optical adhesive because of the filters 54–58 being transmission filters such that the light transmitted by each filter passes through the filter, through the optical adhesive, is reflected from the upper surface 44 of the basic disk 36, again through the optical adhesive 78 and the respective filter, and proceed away from the disk arrangement 32. It is to be appreciated that other affixing means, including means other than adhesive and specifically including means other than optical adhesive may be utilized to affix the pattern disk 38 onto the basic disk 36 so long as an adjustable aspect is provided prior to permanent affixation.

Figure 10:
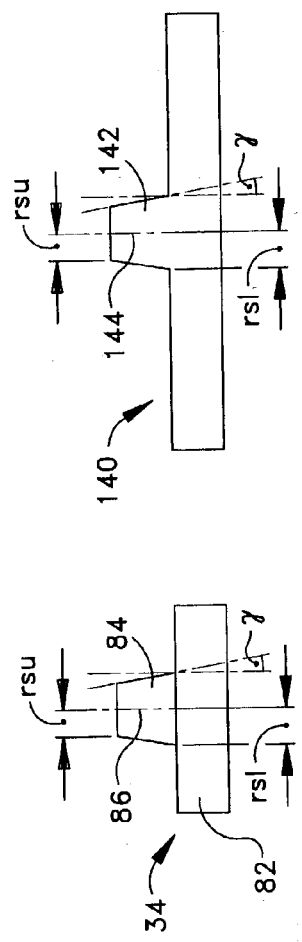
FIG. 10 is a schematic view of a motor platform that has a rotational drive shaft.

The optical pattern disk 38, and the filters 54–58 carried thereon (or individual filters 70–76), should be oriented such that there is no radial offset between the cental axis 66 and an axis about which the filters rotate. Turning to the rotational driving device 34 (FIG. 10), the device includes a motor platform 82 and a shaft 84. The motor platform 82 drives the shaft 84 to rotate about a rotational axis 86. The motor platform 82 may have any suitable construction and configuration for providing torque to rotate the shaft 84. The shaft 84 may have any suitable construction and configuration for interaction with and driving of the disk arrangement 32. In the illustrated example, the shaft 84 has a taper such that the shaft has a truncated cone shape. Specifically, a radius "rsl" of the shaft 84 adjacent to the motor platform 82 is greater than an outer radius "rsu" of the shaft at a distal end of the shaft. As such, the shaft has a taper angle γ.

As mentioned above, different constructions and configurations are possible. For example, the shaft may have a different geometry, such as a half-sphere. Also, the taper(s) may be different. Further, the tapers may even be reversed, with negative taper angles.

In the illustrated example, the taper angle γ of the shaft 84 is different from the taper angle β of the central hole 42 of the basic disk 36. Specifically, in the illustrated example, the radius "rsu" of the distal end of the shaft 84 is less than the radius "rdl" of the central hole 42 adjacent to the lower surface 46 of the basic disk 36 and greater than the radius "rdu" of the central hole adjacent to the upper surface 44 of the basic disk. The radius "rsl" of the shaft 84 adjacent to the motor platform 82 is greater that the radius "rdl" of the central hole 42 adjacent to the lower surface 46. As such, the angle γ is greater than the angle β.

For the illustrated example, the shaft 84 is sized to extend at least partially into the central hole 42. However, at some point along the extension of the shaft 84 into the central hole 42, the shaft will engage the basic disk 36 at the central hole adjacent to the lower surface 46. The engagement is not along the entire extent of the central hole 42. Instead, the engagement is only at the portion of the central hole 42 that is adjacent to the lower surface 46 of the basic disk 36. This permits ease of pivoting of the basic disk 36 relative to the shaft 84 for adjustment purposes.

The permitted pivoting of the basic disk 36 relative to the shaft 84 permits adjustment of the basic disk or the combined basic and pattern disk 38 relative to the rotational axis 86 of the shaft 84. Accordingly, the pivoting permits adjustment to minimize skew. The basic disk 36 mounting is accomplished by the use of a means that permits adjustment for skew correction of an upper surface (e.g., 44 or 68) of the disk arrangement 32 prior to permanent affixing of the basic disk 36 to the shaft 84. In the illustrated example, adhesive 88 that has a setting time is utilized. It is to be appreciated that other affixing means, including means other than adhesive may be utilized to affix the basic disk 36 onto the shaft 84 so long as an adjustable aspect is provided prior to permanent affixation.

As is now to be appreciated and discussed further, the construction of the optical arrangement 30 is accomplished utilizing both an adjustment between the disk 38 and the basic disk 36, and also an adjustment of the basic disk or the entire disk arrangement 32 relative to the shaft 84. It is to be appreciated that these separate steps provides for separately aligning a center axis of a disk arrangement 32 relative to the rotational axis 86 of the rotational driving device 34 for radial offset correction, and separately aligning an interface normal direction, as represented in the example by either the central axis 48 of the basic disk 36 or the center axis 66 of the pattern disk 38, relative to the rotational axis 86 for skew correction.

Figure 11:
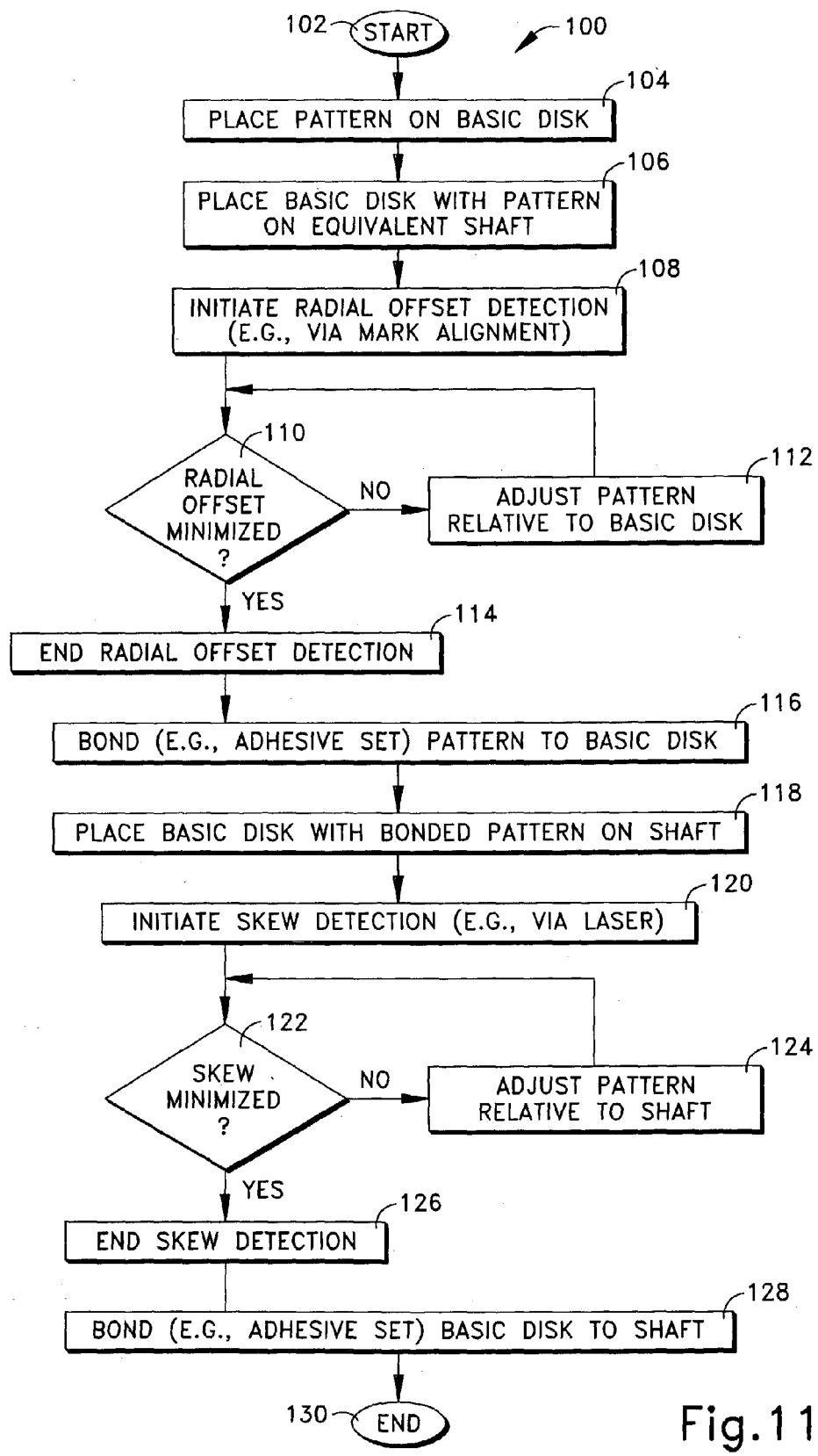
FIG. 11 is a flow chart for a first embodiment of a process for providing the optical arrangement of FIG. 4.

It is to be appreciated that several methodologies are possible to accomplish these separate mounting steps that provide for the separate alignments (radial offset correction and skew correction). FIG. 11 is a flow chart for one example embodiment of such a process 100.

Figure 12:
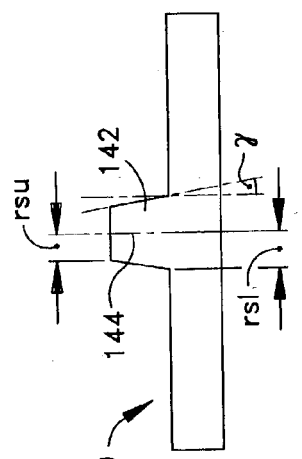
FIG. 12 is a schematic view of an arrangement that provides an equivalent to the shaft of the motor platform shown within FIG. 10.

The process 100 is initiated at step 102 and proceeds to step 104. At step 104, the pattern disk 38 is place onto the basic disk 36 with the adhesive 78 located there between. It is to be appreciated that at this point, the adhesive 78 is not set (e.g., still fluid) such that the pattern disk 38 may be moved relative to the basic disk 36. At step 106, the basic disk 36 with the pattern disk 38 thereon is place onto an equivalent of the shaft 84. Specifically, within the example process 100, the disk arrangement 32 is not placed immediately upon the driving device 34. Instead, a device 140 (FIG. 12), that provides an equivalent (e.g., 142) to the shaft 84 is utilized. As is shown in FIG. 13, the basic disk 36, and thus the entire disk arrangement 32, rests upon the equivalent device 140 without being affixed (e.g., adhered) to the equivalent device 140.

The equivalent device 140 may be as simplistic as a block-like member that has a projection portion 142 that is dimensioned identical to the shaft 84 of the driving device 34. Specifically, the projection portion 142 has a taper with a taper angle γ such that an upper portion has a radius "rsu" and the lower portion has a radius of "rsl" relative to an axis 144. It is to be appreciated that steps 104 and 106 may be done in a reverse order or may be combined.

Figure 15:
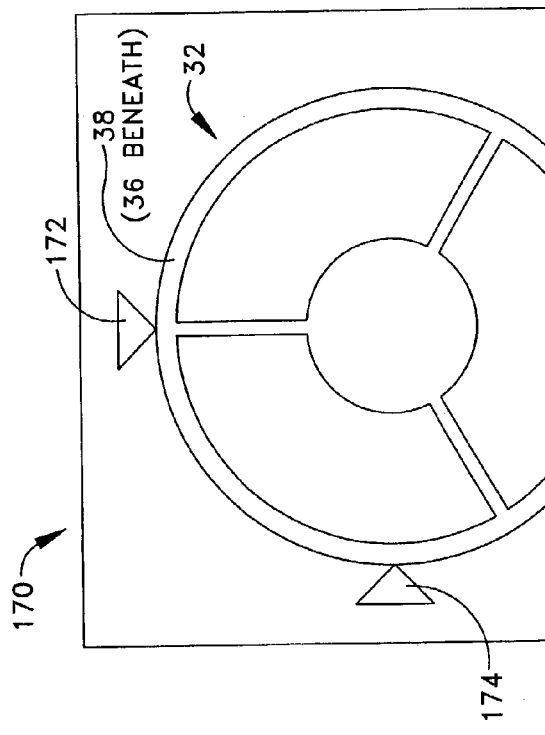
FIG. 15 is a schematic view of a component that may be utilized in connection with a process step associated with FIGS. 13 and 14.

It should be noted that other means of minimizing radial offset may be utilized. For example, FIG. 15 schematically shows a device 170 that may be utilized for aligning the optical pattern disk 38 relative to the central axis 48 of the basic disk 36, with the central axis 48 of the basic disk providing the equivalent to the rotational axis 86 of the shaft. The device 170 is useable if the outer periphery 40 of the basic disk 36 and the outer periphery 60 of the optical pattern disk 38 are each well defined circular configurations. Also, the device 170 eliminates the need for center indicating indicia 64. The device 170 is an alignment gage that includes a plurality (e.g., two) fixed stops 172 and 174 and at least one spring biased stop 176. The device 170 may be easier to utilize then alignment associated with the use of the equivalent device 140.

Turning again to the specifics of the process 100 (FIG. 11), at step 108, radial offset (i.e., radial runout) detection is initiated. Specifically, it is detected or determined whether the center axis 66 of the pattern disk 38 is radially aligned for superposition onto the rotational axis 86 of the shaft 84 of the rotational driving device 34. This is done by aligning or super positioning the center axis 66 of the optical pattern disk 38 with the equivalent rotational axis 144 of the equivalent device 140. In the present example, this detection is provided via a visual check of the alignment of the indicia 64 relative to the distal end of the projection portion 142. Specifically, the fiducial cross should be in the center of the projection portion 142 and the polynomial of the indicia should circumscribe the projection portion 142. Specifically, each side of the polynomial is at minimum distance "rsu"

from the axis 66 at the middle of each side. Accordingly, each side of the polynomial will appear to touch the upper end of the projection portion 142 at the center of the side. FIG. 14 shows the minimization of the radial offset. The visual checking may be aided or enhanced via the use of a magnifying device such as a microscope.

It is to be appreciated that still other means/methodologies may be employed. For example, the edge of the center hole (or more generally, the part of the base matching the shaft) of the base can be used for radial alignment of the optical pattern layer to the base. Within such an example, an indicia would be provided for alignment with the center hole.

At step 110, it is determined whether radial offset is minimized. In other words, is the pattern disk 38 centered with respect to the projection portion 142 of the equivalent device 140. If the determination at step 110 is negative (i.e., the optical pattern disk 38 not centered), the process 100 proceeds to step 112 in which the optical pattern disk is adjusted relative to the basic disk 36. This adjustment is permitted via the fact that the adhesive between the optical pattern disk 38 and basic disk 36 has not yet set. As such, the optical pattern disk 38 is moved relative to the basic disk 36 and relative to the equivalent device 140 because the basic disk is resting upon the equivalent device. Upon completion of step 112, the process loops again to step 110 where it is again queried whether radial offset is minimized. It should be appreciated that steps 110 and 112 tend to go hand and hand and may be intuitively combined when an assembly and alignment procedure is taking place.

Upon an affirmative determination at step 110 ( i.e., the indicia on the pattern disk 38 is aligned with the projection portion 142 on the equivalent device 140 such that radial offset is minimized), the process 100 proceeds from step 110 to step 114. At step 114, the detection of radial offset is ended. At step 116, the pattern disk is affixed or bonded to the basic disk. In the specific example, the adhesive is permitted to set.

At step 118, the basic disk with the bonded pattern disk (e.g., the disk arrangement 32, is placed onto the shaft 84 of the driving device 34 with the adhesive 88 located there between. It is to be appreciated that at this point, the adhesive 88 is not set (e.g., still fluid) such that the basic disk 36 (and the entire disk arrangement 32) may be moved relative to the shaft 84.

At step 120, skew (i.e., axial runout) detection is initiated. In the disclosed example, this detection is via the use of a laser. FIG. 16 shows an example of the use of a laser light beam 150 and an associated optical quadrant photo detector 152. In the example of FIG. 16, the laser light beam 150 is directed at the disk arrangement 32 while the disk arrangement is being rotated by the driving device 34. The laser light beam 150 can be reflected off of the reflective upper surface 44 of the basic disk 36 that is radially within the filters 54–58 and radially outside of the central hole 42 or maybe reflected from a coating on the pattern disk 38. The surface utilized is generally related to the surface that actively interacts with the directing of light proceeding from the completed optical arrangement 30. In one example, the light proceeds through the filters (e.g., 54) and is reflected by the upper surface 44 of the basic disk 36. As such, in order to obtain skew correction for the upper surface 44 relative to the rotational axis 86 of the shaft 84 of the rotational driving device 34, the laser beam is reflected from the upper surface.

It is to be appreciated that a specially applied reflecting structure (e.g., on the pattern disk) can be used to generate a well-defined refection signal. Such structure would help avoid ambiguity originating from multiple refection from different interfaces.

The laser light beam 150 reflects from the disk arrangement 32 and proceeds toward the quadrant photo detector 152, which has four quadrants 154–160. With the laser beam reflecting from the disk arrangement 32, the disk arrangement is rotated by the rotational driving device 34.

At step 122 it is determined whether skew is minimized. This determination is made based upon whether the reflected laser light that impinges upon the quadrant photo detector 152 moves among the four quadrants 154–160 during rotation of the disk arrangement 32. Specifically, if the reflective surface (e.g., the upper surface 44 of the basic disk 36) has an interface normal direction (e.g., central axis 48) that is skewed relative to the rotational axis 86 of the diving device 34, the reflected beam impinging upon the photo detector 152 will move among the quadrants 154–160. In one example, a circular or elliptical pattern 162 will be traced by the impinging beam and shown in FIG. 16.

If the determination at step 122 is negative (i.e., skew is not minimized and the impinging beam moves among the quadrants 154–160), then the process 100 goes from step 122 to step 124. At step 124, the basic disk 36 is adjusted relative to the shaft 84. In other words, the basic disk 36, along with the adhered pattern disk 38 is pivoted as needed relative to the shaft 84. In one example, a device (e.g., a gripper) 166 (schematically shown in FIG. 16) applies force (e.g., a pushing force) to one side of the disk arrangement 32 (i.e., basic disk 36 and the adhered pattern disk 38) to cause the movement.

Upon completion of step 124, the process 100 loops to step 122 where it is again queried whether skew is minimized. Again, this query is answered dependent upon the amount of movement of the reflected beam impinging upon the quadrants 154–160 of the quadrant photo detector 152. It is to be noted that the correction process can be automated, especially in view of the use of a quadrant photo detector.

Once the skew (i.e., axial runout) is minimized, the determination at step 122 is affirmative and the process 100 proceeds to step 126. At step 126, the detection of skew is ended. At step 128, the basis disk 36 is affixed or bonded to the shaft 84. In other words, the adhesive 88 is allowed to set. The process 100 then ends at step 130. For the example shown in FIG. 17, it is mandatory that the interface normal direction is chosen to be perpendicular to the basic disk.

Figure 17:
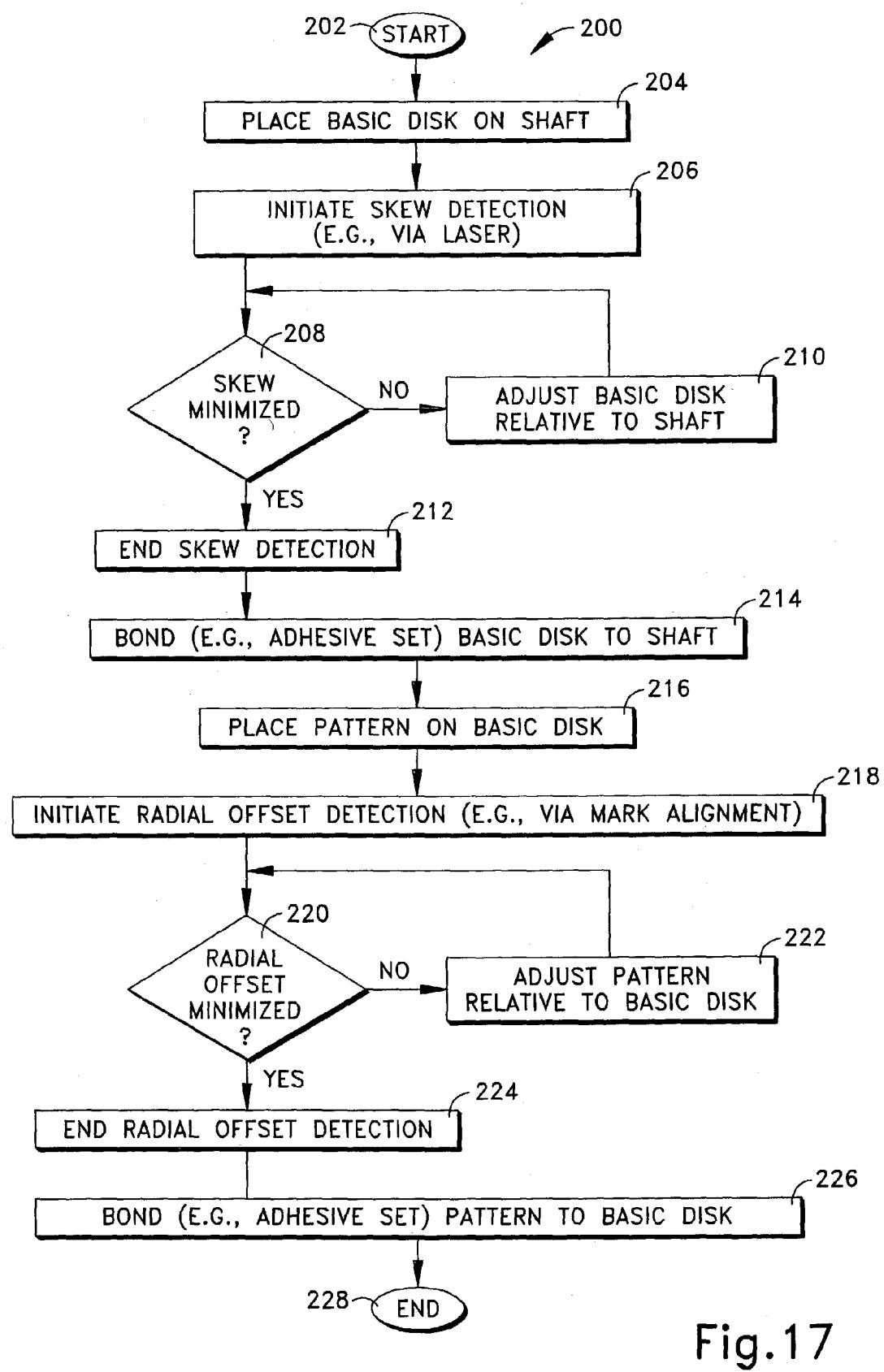
FIG. 17 is a flow chart of another embodiment of a process for providing the optical arrangement of FIG. 4.
Figure 18:
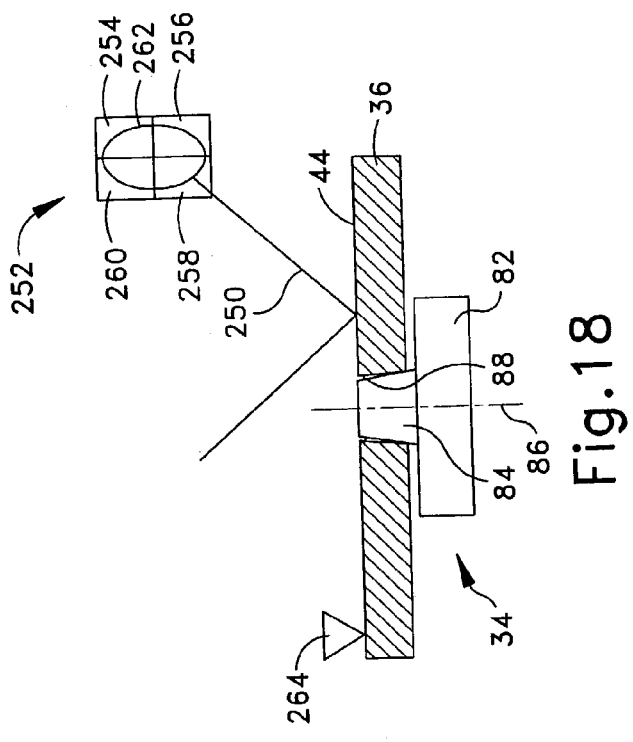
FIG. 18 is a schematic view partially in section of portions of the optical arrangement of FIG. 4 and other associated components for a step within the process set forth within FIG. 17.

Another example process 200 in accordance with the present invention is set forth within the flow chart of FIG. 17. The process 200 is initiated at step 202 and proceeds to step 204. At step 204, the basic disk 36 is placed upon the shaft 84 with the adhesive 88. It is to be appreciated that the adhesive 88 is still fluid such that the basic disk 36 may be pivoted relative to the shaft 84. At step 206, detection of skew (i.e., axial run) out is initiated. In one specific example, a laser light beam 250 (FIG. 18) is used to detect skew.

The laser beam 250 is reflected from the upper surface 44 of the basic disk 36 and the reflected light proceeds toward an optical quadrant photo detector 252. Similar to the arrangement shown in FIG. 16, movement of the reflected laser light among quadrants 254–260 of FIG. 18 (e.g., an elliptical pattern 262) indicates skew.

At step 208, it is determined whether skew (i.e., axial runout) is minimized. If the determination at step 208 is negative (i.e., skew is not minimized), the process 200 proceeds from step 208 to step 210. At step 210, the basic disk 36 is adjusted relative to the shaft 84. Specifically, the basic disk 36 is pivoted as needed to correct the skew. A device, such a gripper, 264 may be employed to apply force (e.g., a pushing force) to the basic disk 36 during the adjustment. Upon completion of step 210, the process 200 loops to step 208 where it is again queried whether skew is minimized. It is to be appreciated that step 208 and 210 are closely related and may be combined in a single step.

Upon an affirmative determination as step 208 (i.e., skew is minimized) the process 200 proceeds to step 212. At step 212, the detection of skew is ended. At step 214, the basic disk 36 is affixed or bonded to the shaft 84. In the specific example, the adhesive 88 (FIG. 18) is allowed to set.

Figure 19:
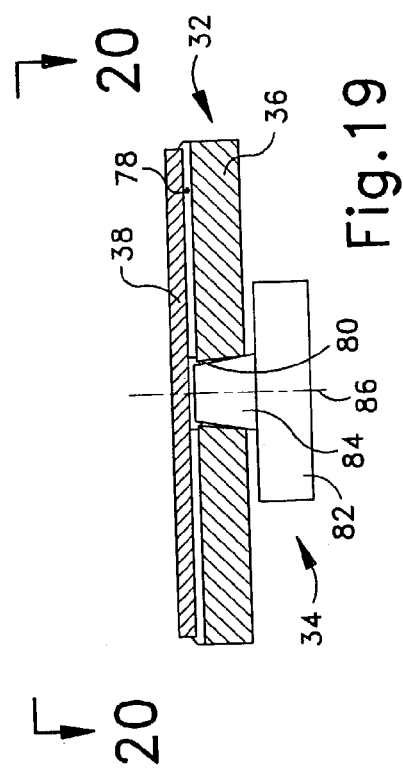
FIG. 19 is a schematic view of the components of the arrangement of FIG. 4 during another step of the process set forth within the process of FIG. 17.

At step 216 (FIG. 17), the pattern disk 38 is placed upon the basic disk 36 (FIG. 19). Associated with this is the placement of adhesive 78 between the pattern disk 38 and the basic disk 36. At step 218, radial offset (i.e., run out) detection is initiated. In one example, the detection of radial offset is based upon observation of the alignment of the indicia 64 (FIG. 20) on the pattern disk 38 relative to the shaft 84 on the driving device 34. The observation may be aided by the use of an image enhancing device such a microscope.

At step 220, it is determined whether radial offset (i.e., radial run out) is minimized. If the determination at step 212 is negative (i.e., radial offset is not minimized), the process 200 proceeds to step 222. At step 222, the pattern disk 38 is adjusted relative to the basic disk 36 and the shaft 84. Specifically, the adjustment is such that the indicia 64 is aligned visually with the shaft 84. Upon completion of step 222, the process 200 loops again to step 220 where it is determined whether radial offset is minimized. It is to be appreciated that steps 220 and 222 are closely related and may be integrated into a single step or consideration.

Figure 20:
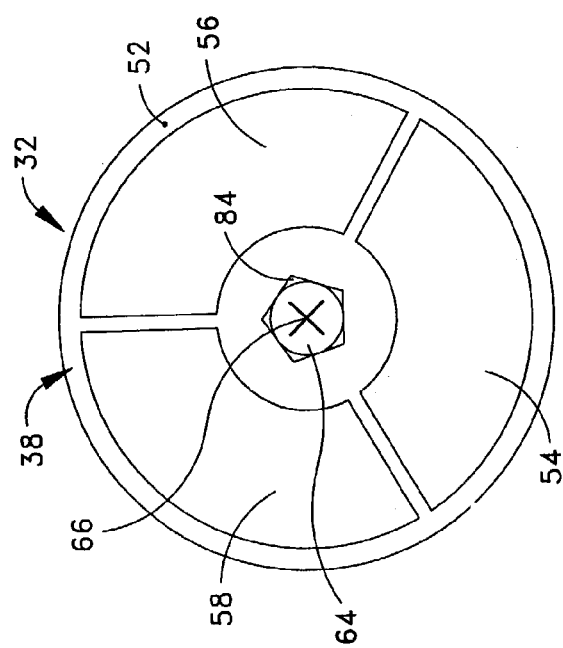
FIG. 20 is a top view taken along line 20—20 within FIG. 19.

Upon an affirmative determination at step 222 (i.e., radial offset is minimized), the process 200 proceeds to step 224 where the radial offset detection is ended. This will occur when the indicia 64 is aligned with the shaft 84 as is shown in FIG. 20. At step 226, the pattern disk 38 is attached or bonded to the basic disk 36. In the disclosed example, the adhesive 78 is allowed to set. At step 228, the process 200 ends.

In view of the above discussed several examples, it should be appreciated that several possibilities for achieving the present invention are possible. In sum, these different examples provide for the separate alignment of the center axis of the disk arrangement 32 (i.e., the central axis 48 of the basic disk 36 or the central axis 66 of the pattern disk 38) to the mechanism-induced rotational axis 86 for radial offset correction. These also provide for the separate alignment of the interface normal direction, as indicated by the central axis 48 or the central axis 66 relative to the mechanism-induced rotational axis 86 for skew correction.

From the above description of the invention, those skilled in the art will perceive improvements, changes and modifications in the invention. Such improvements, changes and modifications within the skill of the art are intended to be covered by the appended claims.

What is claimed:

1. An optical arrangement including:
   a base for rotation about a mechanism-induced rotational axis;
   an optical pattern layer having a center axis and having at least two portions that each have a different optical characteristic, one of the base and the optical pattern layer having a surface perpendicular to an interface normal direction;
   means for fixing the optical pattern layer to the base for rotation therewith such that the center axis is aligned against radial offset with the rotational axis;
   a mechanism for rotating the base and the optical pattern layer around the mechanism-induced rotational axis; and
   means for fixing the base to the mechanism such that the interface normal direction is aligned against skew from the mechanism-induced rotational axis;
   wherein the means for fixing the base to the mechanism includes an adhesive that sets once the interface normal direction is aligned; and
   wherein the mechanism includes a shaft, and the base includes an opening, the opening has a taper, the shaft has an end that has a size equal to the opening at some location along the taper, and the base rests upon the shaft at the location where the opening equals the shaft end.

2. An optical arrangement as set forth in claim 1, wherein the base is at an angular orientation relative to the shaft when the interface normal direction is aligned against skew and the adhesive is set.

3. An optical arrangement as set forth in claim 2, wherein at least one of the base and optical pattern layer includes means for reflecting light directed thereat, and the angular orientation of the base relative to the shaft is such that a light directed at the means for reflecting is reflected in a manner indicating that the interface normal direction is aligned against skew.

4. An optical arrangement as set forth in claim 1, wherein the shaft has a taper that has a taper angle that is different from a taper angle of the opening.

5. An optical arrangement as set forth in claim 1, wherein the optical pattern layer does not have an opening.

* * * * *